United States Patent [19]

Haley et al.

[11] Patent Number: 5,314,385
[45] Date of Patent: May 24, 1994

[54] SYSTEM FOR COOLING A STARTING CLUTCH OF A CONTINUOUSLY VARIABLE TRANSMISSION

[75] Inventors: William J. Haley, Chippewa Falls, Wis.; Alan L. Miller; Karl F. Schneider, both of Ithaca, N.Y.

[73] Assignee: Borg-Warner Automotive, Inc., Sterling Heights, Mich.

[21] Appl. No.: 975,736

[22] Filed: Nov. 13, 1992

[51] Int. Cl.⁵ ............................................. F16H 61/00
[52] U.S. Cl. ................................................... 474/28
[58] Field of Search ................. 474/17, 18, 28, 69, 474/70, 11, 12; 74/866–868; 192/0.076, 0.096, 103 R

[56] References Cited

U.S. PATENT DOCUMENTS

| | | | |
|---|---|---|---|
| 3,951,393 | 4/1976 | Smirl | 267/161 |
| 4,433,594 | 2/1984 | Smirl | 74/689 |
| 4,458,318 | 7/1984 | Smit et al. | 364/424.1 |
| 4,522,086 | 6/1985 | Haley | 74/867 |
| 4,648,496 | 3/1987 | Petzold et al. | 192/0.076 |
| 4,982,822 | 1/1991 | Petzolf et al. | 474/28 X |
| 5,006,092 | 4/1991 | Neuman et al. | 474/8 |
| 5,060,768 | 10/1991 | Yamashita et al. | 474/28 X |
| 5,086,671 | 2/1992 | Oshidari | 474/28 X |
| 5,183,439 | 2/1993 | Yumoto et al. | 474/69 X |

Primary Examiner—Thuy M. Bui
Attorney, Agent, or Firm—Willian Brinks Olds Hofer Gilson & Lione

[57] ABSTRACT

A clutch cooling system for cooling a clutch used in combination with a continuously variable transmission including a pressure controlled spool valve having a housing defining a chamber, a spool movably mounted by a spring within the chamber, and a notch defined by the housing such that as the leading edge of the spool aligns with the notch a variable orifice is formed; a pressure controller means for adjusting the pressure applied to the remote end of the spool such that as the pressure applied to the remote end is reduced the spring decompresses causing the spool to traverse the housing and further causing the leading edge of the spool to pass along the notch thereby increasing the size of the variable orifice; a slot located within the spool that allows for minimum cooling flow when the spool valve variable orifice is closed; a cooling fluid feed line and a clutch cooling line extending from the chamber such that cooling fluid can flow from the cooling fluid feed line, into the chamber, through the orifice and into the clutch cooling line; and a electronic clutch control system for regulating clutch slippage wherein during a given amount of clutch slippage a predetermined electrical signal is sent to the pressure controller resulting in a given pressure being applied to the remote end of the spool.

20 Claims, 9 Drawing Sheets

SYSTEM FOR COOLING A STARTING CLUTCH OF A CONTINUOUSLY VARIABLE TRANSMISSION

BACKGROUND OF THE INVENTION

1. Field of the Invention

This invention relates generally to a system for cooling a starting clutch of a continuously variable transmission, and more particularly to a control system for clutch cooling which allows greater coordination between the amount of clutch cooling and the amount of clutch slippage, thereby enabling greater flexibility in regulating and modifying clutch slippage.

2. Description of the Prior Art

Continuously variable transmissions (CVT's) provide continuously variable drive ratios by using a belt between two variable-diameter pulleys. A detailed discussion of how such systems operate is set forth in U.S. Pat. Nos. 4,433,594, 4,522,086 and 4,982,822, each of which is incorporated herein by reference. In general, a belt intercouples two variable-diameter pulleys, an input or primary pulley and an output or secondary pulley. Each pulley includes a fixed sheave and a movable sheave. A hydraulic control system is employed to enable axial movement of both the primary and secondary movable sheaves, thereby changing the effective diameters of the pulleys. When the transmission is in operation the effective diameter of the primary pulley is varied to provide a continuously variable drive ratio, while the effective diameter of the secondary pulley is varied in order to maintain belt tension and avoid belt slippage.

As with conventional transmissions, a automobile having a CVT system also requires a start clutch to permit engagement and disengagement of coupled shafts which transmit torque. The start clutch for a CVT system can be located either upstream or downstream of the belt and sheave system of the CVT. Various types of start clutches can be employed with a CVT, including wet clutches or electromagnetic clutches. With wet start clutches, however, removal of heat generated during engine stall is required. Furthermore, clutches that are designed to provide slippage in order to reduce coupling shock during the engagement period, or when the torque exceeds its maximum rating, produce heat during such slippage which must be dissipated.

One type of start clutch typically used in combination with a CVT is a fluid actuated and fluid cooled start clutch. Such start clutch assemblies commonly include a cup-shaped cover plate, a pressure plate, a reaction plate, a clutch disc assembly, a Belleville spring, and connecting elements. The clutch disc assembly includes a clutch disc having an energy-absorbing layer and a friction material layer mounted on each of its faces. This type of start clutch operates as follows. The pressure plate is biased by the Belleville spring to a disengaged condition. The clutch is engaged by fluid actuating the pressure plate. This is accomplished by increasing fluid pressure in a clutch fluid pressure chamber that is defined by the cover plate and the pressure plate. When the fluid pressure is increased in the fluid pressure chamber, the force of the Belleville spring is overpowered. The pressure plate is thereby thrust into contact with the clutch disc assembly, and into driving communication with the reaction plate through the friction faces of the clutch disc.

The start clutch also includes a cooling fluid cavity chamber. Cooling fluid is circulated through the cooling chamber in order to dissipate heat generated by the friction between the reaction plate and the friction faces during clutch engagement, i.e. during clutch slippage. When minimal or no cooling flow is required (e.g., when the clutch is fully engaged or fully released, and at low relative speed creep) the clutch cooling flow port is closed in order to reduce drag and provide energy savings. In accordance with prior art cooling system designs, however, there was limited coordination between the need for cooling and the circulation of cooling fluid.

Systems have been proposed for cooling a starting clutch in a CVT during the clutch slippage period. Smith et al. U.S. Pat. No. 4,458,318 discloses a starting clutch cooling system which includes an FEMA valve, a spool valve and a solenoid valve. The spool valve is responsive to pressure changes in two diametrically opposed chambers contained therein. A spool contained within the valve is movably located between these two chambers. The pressure in one chamber remains fixed, whereas the pressure in the second chamber is varied by the FEMA valve. An electrical signal controls FEMA valve. The electrical signal causes a plunger in the FEMA valve to restrict a bore, thereby restricting fluid flow between the second chamber in the spool valve and the FEMA valve. This causes an increase in the pressure in the spool valve's second chamber. The resulting pressure differential between the two diametrically opposed chambers causes the spool to laterally move permitting fluid to flow to the solenoid valve. The solenoid valve is vacuum operated. When open, the solenoid valve allows fluid flow to a clutch cooling fluid chamber.

Other systems have been employed as well, including non-electronic systems which offer limited control of cooling fluid flow. The present invention, however, provides a better system design which incorporates electronic control means to enable exceptional control of the clutch cooling, while also enabling coordination between the need for clutch cooling and the coolant flow rate.

OBJECTS AND SUMMARY OF THE INVENTION

It is therefore an object of the present invention to provide a clutch cooling system that permits electronic control of clutch cooling thereby allowing greater coordination between the amount of clutch cooling and the amount of clutch slippage.

It is also an object of the present invention to provide a clutch cooling system having an electronically controlled dual setting clutch cooling means.

It is a further object of the present invention to provide a clutch cooling system having proportional cooling flow as a function of electrical input.

These and other objects are met by the clutch cooling system of the present invention which in accordance with one embodiment includes a high response solenoid valve and a pressure controlled clutch cooling spool valve, both of which interconnect a series of conduits including a pressure feed conduit, a pilot pressure conduit, a lubricant feed line, and a clutch cooling line. The pressure controlled spool valve includes a housing defining a chamber, and has a spool located within the housing and extending through the chamber. The housing further defines a notch located at the clutch cooling line. As the spool traverses the chamber, the leading edge of the spool passes along the notch to form a variable orifice whose size varies with the lateral position of the spool. The lateral position of the spool is determined by the amount of pressure applied to the remote end of the spool valve. That pressure is regulated by the solenoid valve and is determined by the pulse-width modulated (PWM) signal sent to the solenoid valve. The cooling fluid feed line and the clutch cooling line extend from the spool valve chamber such that when the orifice is formed, cooling fluid can flow from the cooling fluid feed line, into the chamber, through the orifice and into the clutch cooling line. A slot in the spool provides a minimal flow path into the clutch cooling feed line at all valve positions. The slot in the spool valve can also be left out if there is no need for minimal cooling flow. When minimal or no cooling flow is required, for example, when the clutch is fully engaged or fully released, the clutch cooling flow port is closed for reduced drag and energy savings.

DESCRIPTION OF THE DRAWINGS

Additional objects and advantages of the present invention will be more readily apparent from the following detailed description of preferred embodiments thereof when taken together with the accompanying drawings in which.

GENERAL BACKGROUND DESCRIPTION

Before discussing the specific details of the present invention, the following discussion provides a background description of a CVT and a clutch system compatible therewith. It will be readily apparent, however, to those skilled in the art that the present invention can be utilized with alternative CVT/clutch designs.

Figure 1:
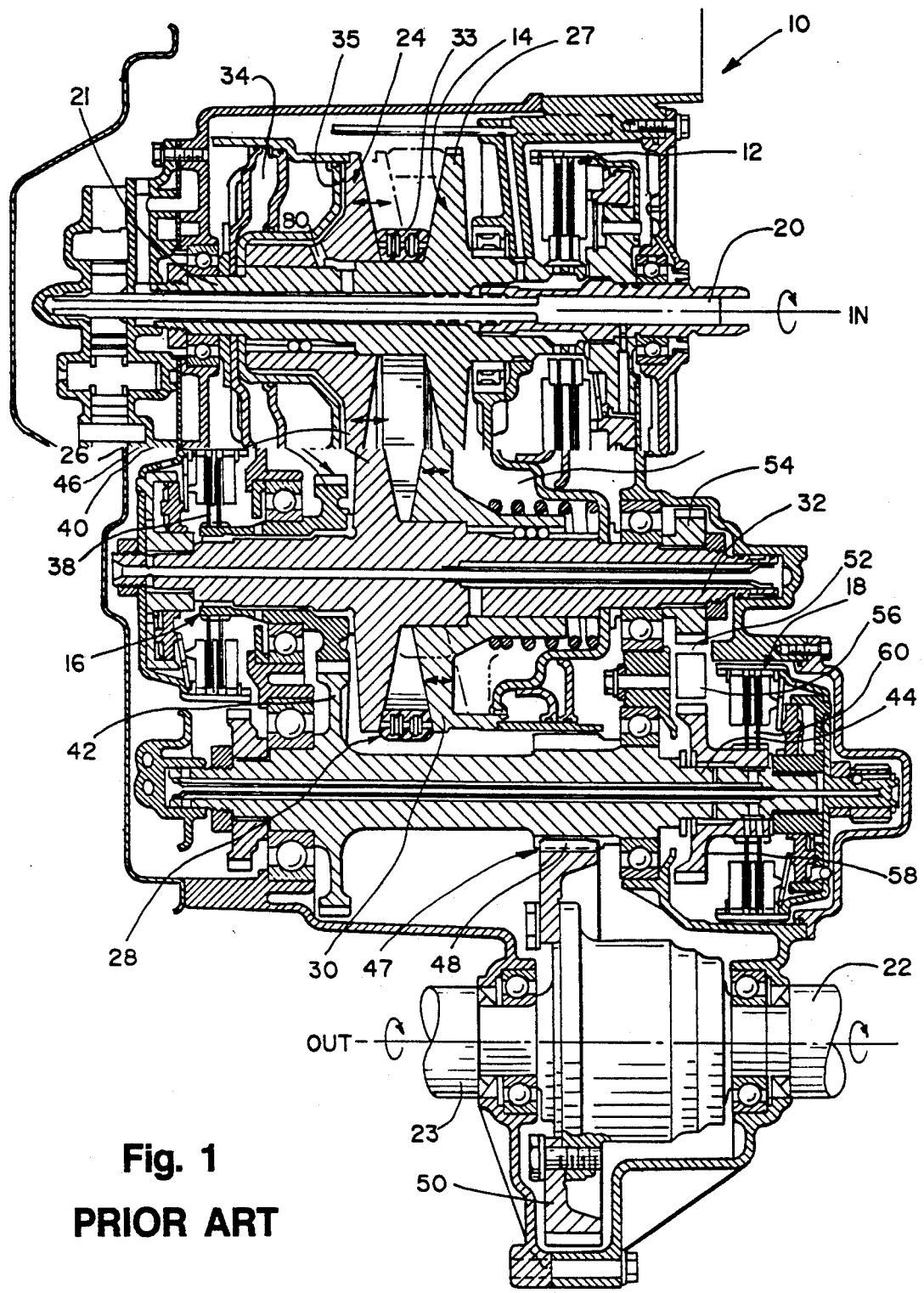
FIG. 1 is a sectional view of a continuously variable transmission assembly, wherein the start clutch is located upstream from the CVT belt and sheave system.
Figure 2:
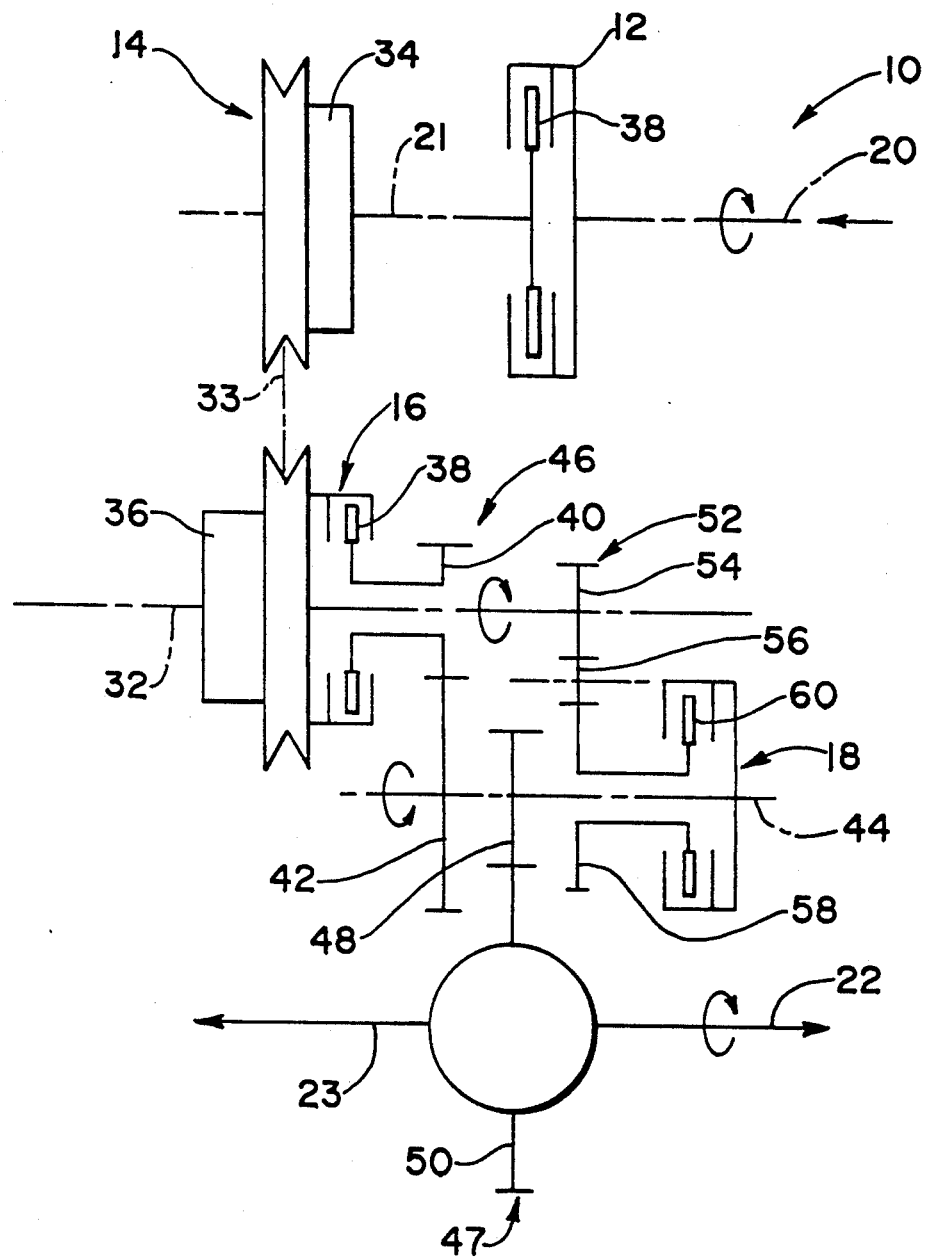
FIG. 2 is a schematic representation of the continuously variable transmission assembly illustrated in FIG. 1.

Turning to FIGS. 1 and 2, a compact arrangement for a conventional continuously variable transmission (CVT), known in the prior art, generally designated 10 is shown. FIG. 2 is a schematic representation illustrating the general features of the transmission system of FIG. 1. While FIG. 1 gives a more detailed depiction of the transmission system, FIGS. 2 schematically illustrates the major components and their locations. The CVT illustrated in FIGS. 1 and 2 is described in greater detail in U.S. Pat. No. 5,006,092, which is incorporated herein by reference.

Figure 2A:
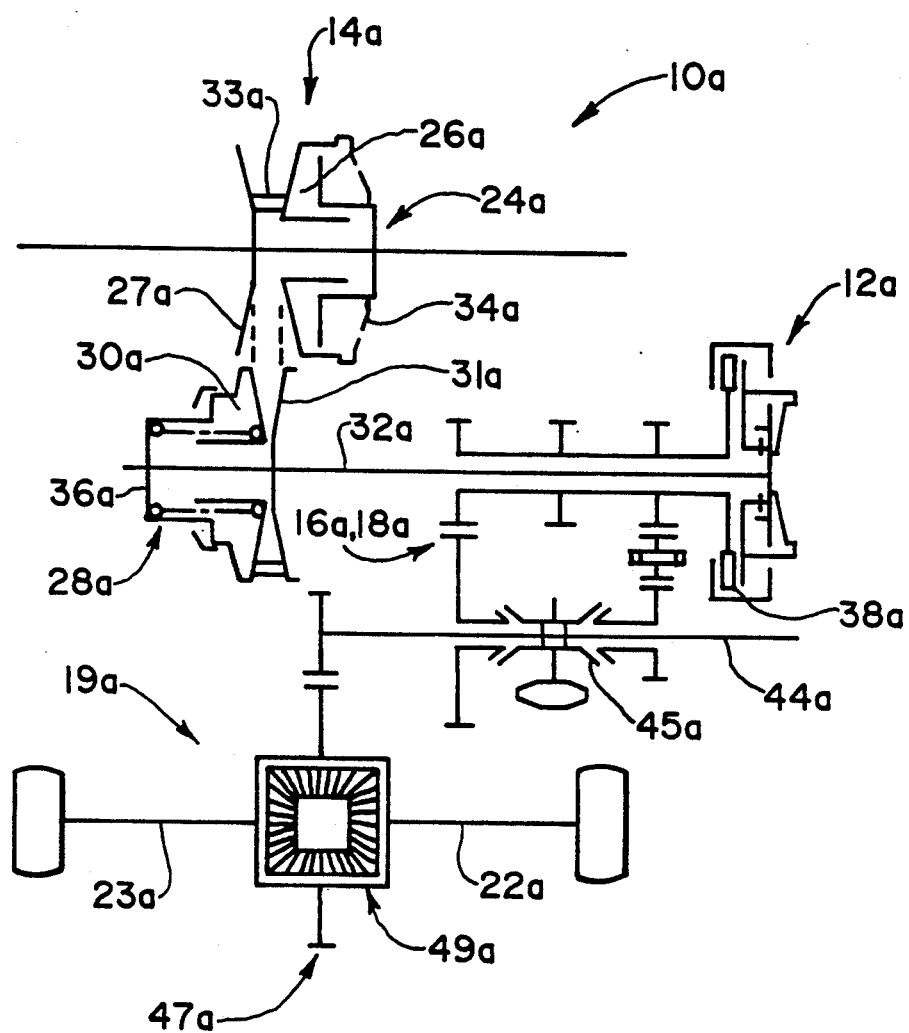
FIG. 2A is a schematic representation of an alternative design of a continuously variable transmission assembly wherein the start clutch is located downstream from the CVT belt and sheave system.

Referring now to FIGS. 1 and 2, a slippable start clutch 12 is located upstream of a belt and sheave system, shown generally as 14. Non-dynamic forward and reverse clutches 16, 18 are situated downstream of the belt and sheave system 14. In an alternative embodiment, as schematically shown in FIG. 2A, the slippable start clutch can be located downstream of the belt and sheave system. Such a design is described in more detail in U.S. Pat. No. 4,433,594, which is incorporated herein by reference. The present invention can be incorporated in either embodiment.

Referring again to FIGS. 1 and 2, the belt and sheave system 14, which is described more fully below, includes a first and a second variable pulley and an endless belt connecting the pulleys. The non-dynamic clutches 16, 18 have predetermined clutch capacities to allow them to act as fuses to prevent the transmission of a torque spike to the belt and sheave system 14.

The continuously variable transmission includes a pair of input shafts 20, 21 for the input of the torque from the engine (not shown) to the transmission, and a pair of output shafts 22, 23 for the output of torque from the transmission to the vehicle drive wheels (not shown). As can best be seen in FIG. 1, a first variable pulley 24 having a first movable sheave 26 and a first fixed sheave 27 is disposed on the shaft 21. A second variable pulley 28 having a second movable sheave 30 and a second fixed sheave 31 is disposed on a first intermediate shaft 32. The first and second pulleys 24 and 28 are coupled by an endless belt 33. The flexible belt can be of a metal or elastomeric construction, as known in the art.

The start clutch 12 is located on the input shaft 20. The start clutch acts to transmit torque from shaft 20 to shaft 21. The start clutch 12 is a slippable clutch that is fluid actuated. The pressure of fluid applied to the start clutch 12 controls the amount by which the start clutch 12 slips. A controlled minimum clutch slippage during operation can be used to reduce the transmission of torsional vibrations from the engine (not shown) to the pulley system of the CVT. The starting device need not be a clutch, but can also be a torque converter or other fluid coupling means (not shown).

The operation of the continuously variable transmission 10 is controlled by the pressure of fluid supplied to the first and second servo chambers 34, 35, 36. First servo chambers 34, 35 receive fluid to force movement of the first movable sheave 26 to regulate the ratio between the shaft 21 and first intermediate shaft 32. Second servo chamber 36 receives fluid to force movement of the second movable sheave 30 to regulate the clamping force on the belt 33 to prevent belt slippage.

Downstream of the belt and sheave system 14, the non dynamic, forward clutch 16 is disposed on the first intermediate shaft 32 and the non-dynamic, reverse clutch 18 is disposed on a second intermediate shaft 44. The forward and the reverse clutches are non-dynamic and therefore operate in one of two conditions: a first or locked condition; or a second or unlocked condition. The forward and reverse clutches are hydraulically actuated between the first and second conditions in response to the position of a gear lever (not shown). Engagement of the forward clutch 16 causes, through a series of gear members, the transmission output shafts 22, 23 to rotate in a first direction for forward movement of the vehicle. Engagement of the reverse clutch 18 causes, through a series of gear members, the transmission output shaft 22, 23 to rotate in a second direction opposite to the first direction for reverse movement of the vehicle. The forward and the reverse clutches 16, 18 are not engaged at the same time, as this results in the system being locked preventing rotation of the output shafts 22, 23 in either direction. Both clutches are released when the transmission is in the neutral or park condition.

A forward gearing system 46 is coupled for rotation with the movable clutch plate 38 of the forward clutch 16. The system 46 is driven by the CVT when the forward clutch 16 is engaged to couple the first intermediate shaft 32 to the second intermediate shaft 44. When the forward clutch 16 is released, no torque is transmitted to the second intermediate shaft 44. The forward gearing system 46 includes a drive gear 40 connected to the clutch plate 38 and a driven gear 42 disposed for rotation with the second intermediate shaft 44.

The second intermediate shaft 44 is coupled to the transmission output shafts 22, 23 through an output gear system 47 that includes a drive gear 48 and a driven gear 50. With the output gear system 47 as illustrated, the transmission output shaft 22, 23 rotate in the same direction as the first intermediate shaft 32 to drive the vehicle in the forward direction when the forward clutch 16 is engaged. The gearing system could, however, take an alternative arrangement and cause the output shafts 22, 23 to rotate in the opposite direction of the second intermediate shaft 44 allowing the output shafts 22, 23 to rotate in the forward direction for forward motion and the reverse direction for reverse motion.

A reverse gearing system 52 couples the second intermediate shaft 44 to the movable clutch plate 60 of the reverse clutch 18. When the reverse clutch 18 is engaged, the reverse gearing system 52 drives the second intermediate shaft 44. The reverse gearing system 52 includes a drive gear 54, and idler gear 56, and a driven gear 58 so that the second intermediate shaft 44 rotates in the opposite direction when the reverse clutch 18 is engaged to that in which it rotates when the forward clutch 16 is engaged. The drive gear 54 is disposed on the first intermediate shaft 32 and rotates with the first intermediate shaft 32 at all times. The idler gear is located on an offset shaft (not shown). When the reverse clutch 18 is released, the clutch plate 60 and driven gear 58 rotate freely on the second intermediate shaft 44 and there is no transfer of torque to the second intermediate shaft 44 through the reverse gearing system 52. When the reverse clutch 18 is engaged and the forward clutch 16 released, the second intermediate shaft 44 rotates in the second direction. The second intermediate shaft 44 in turn drives the output shafts 22, 23 through the output gear system 47 to move the vehicle in the reverse direction.

It is important to the operation of this system that, in addition to changing condition in response to the position of a gear level, non-dynamic forward and reverse clutches 16, 18 slip when the torque to be transmitted is in excess of the clutch capacity. The clutch capacities of the forward and reverse clutches 16, 18 are therefore predetermined to be greater than the maximum torque transmitted to the drive train in order that slippage does not occur during ordinary operation of the engine.

Figure 3:
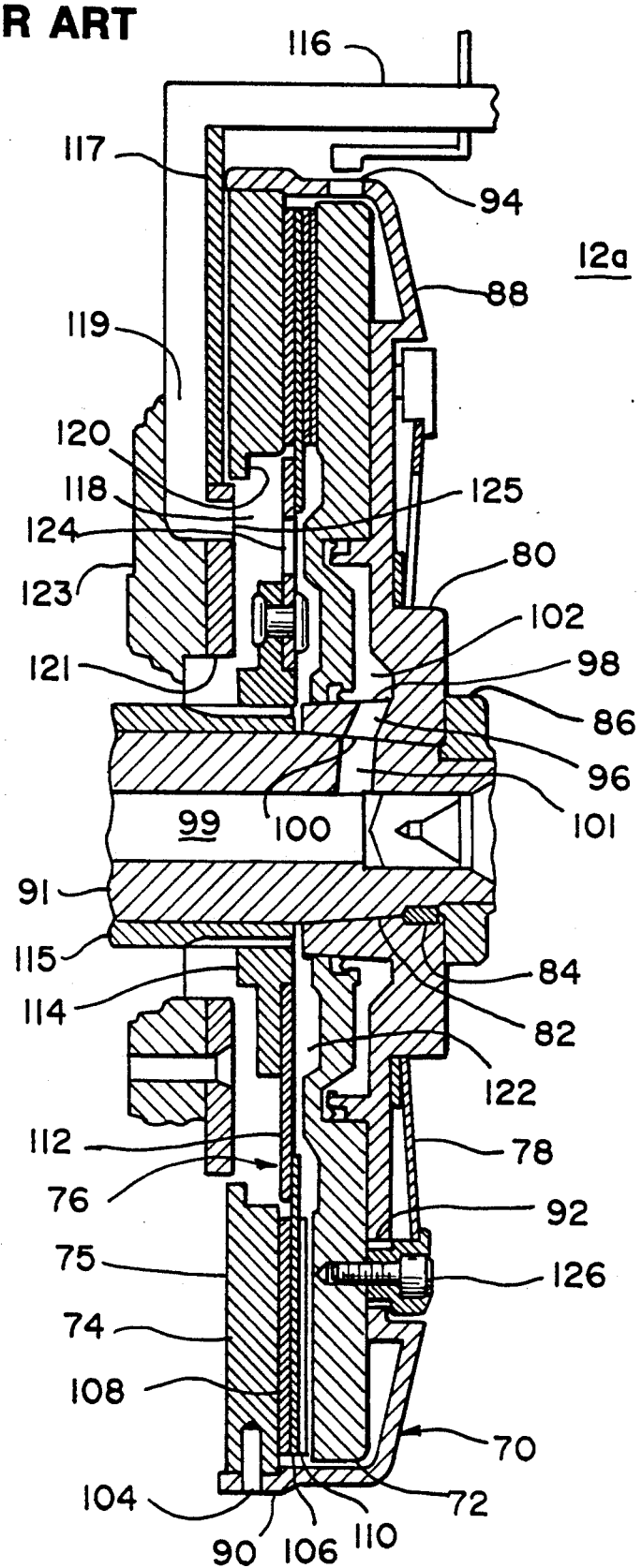
FIG. 3 is a sectional view of a slippable start clutch employed in the continuously variable transmission assembly schematically illustrated in FIG. 2A.

A typical start clutch assembly, known in the prior art, that is compatible with a CVT incorporating the present invention, is shown in greater detail in FIG. 3. The clutch illustrated in FIG. 3 is a start clutch utilized in the design schematically depicted in FIG. 2A, wherein the start clutch 12a is downstream of the belt and sheave system 14a, and is described in greater detail in U.S. Pat. No. 4,433,594, which is incorporated herein by reference.

Referring now to FIG. 3, the start clutch assembly includes a cup-shaped cover plate 70, a pressure plate 72, a reaction plate 74, a clutch disc assembly 76, a Belleville spring 78 and connecting elements. The start clutch is mounted on shaft 91 where cover plate 70 defines a hub 80 and a tapered bore 82. The start clutch is fitted onto shaft 91 and positioned by a dowel pin 84 and secured at hub 80 by a locknut 86, which abuts hub 80 and is screwably affixed to shaft 91. Cover plate 70 defines a front face 88, a perimeter wall 90, a series of connecting-means portals 92 on its front face 88, and a plurality of vent holes 94 equally spaced on perimeter wall 90. Hub 80 defines a conduit 96 and ports 98, 100. Cover plate 70 and pressure plate 72 cooperate to define an annular clutch fluid pressure chamber 102 which communicates with conduit 99 through passage 101 and conduit 96.

Reaction plate 74 is affixed to cover plate 70 by a securing means 104 illustrated as a pin or dowel; this reaction plate 74 has a backface 75. Plate 74 can be secured by any means known in the art. Clutch disc assembly 76 includes a clutch disc 106 with large oil grooves for fluid transfer (not shown), an annular ring 112 and a spline member 114. Clutch disc 106 has an energy-absorbing layer (not shown) and a friction material layer (108 and 110) mounted on each of its faces. This composite arrangement is positioned between and engageable by pressure plate 72 and reaction plate 74. Disc 106 is drivingly affixed to the outer perimeter of annular ring 112 and this combination is secured to the spline member 114 at the inner diameter of annular ring 112, which spline member 114 is splined to sleeve 115 of a forward gear (not shown).

The start clutch is fluid actuated and cooled. Coolant is provided through a fluid conduit 116 connected to a fluid source (not shown). Various components of the start clutch define a series of cavities, passageways, ports, and vent holes for facilitating circulation of clutch cooling fluid. Plate 74, annular ring 112 and plate 121 define an open cavity 118. A thin metal annular sheet 117 affixed to plate 121 is in a plane parallel to face 75 of driven plate 74. Flange 123 and metal sheet 117 define a wide passage 119 which communicates with conduit 116. Plate 121 defines a large port 125 which communicates between passage 119 and cavity 118. Reaction plate 74 defines a shoulder 120 to retain the cooling fluid in clutch cavity 118 during rotational motion of the clutch. Clutch disc assembly 76 and pressure plate 72 cooperate to define an irregularly shaped annular cavity 122 which communicates with vent holes 94 of cover plate 70. Annular ring 112 defines a series of communicating ports 124 to communicate coolant fluid from cavity 118 to cavity 122 and thereafter past the friction face of clutch 106 adjacent to pressure plate 72 while the friction face of clutch 106 adjacent to reaction plate 74 is fed by cavity 122 and thus to provide coolant fluid emission through vent holes 94 during rotation of the clutch.

The start clutch illustrated in FIG. 3 operates as follows. Pressure plate 72 is connected to zero rate Belleville spring 78 (as explained in U.S. Pat. No. 3,951,393) by connecting means 126 through portals 92, and plate 72 is biased by spring 78 to a disengaged condition as illustrated in FIG. 3. Pressure plate 72 is fluid actuated by fluid pressure in chamber 102 adequate to overcome the force of Belleville spring 78 and to thrust pressure plate 72 in an axial direction into contact with clutch disc assembly 76 and into driving communication with reaction plate 74 through friction faces 108, 110.

Coolant fluid is supplied through conduit 116 to cooling fluid cavity chamber 118. As clutch engagement pressure plate 72 contacts friction facing 110 to drivingly engage driven plate 74 through disc 106, spline member 114 is driven by annular ring 112 and disc 106. Thereafter, rotational motion is communicated to a forward gear and a reverse gear (not shown). Forward or reverse drive direction, or neutral, if desired, is selectable by operation of a synchronizer 45a (FIG. 2A). As illustrated in FIG. 2A, upon engagement of the synchronizer 45a, rotational motion is transferred to the final drive assembly 19a, which assembly includes elements such as a differential 49a, and axle means 22a, 23a as known in the prior art.

DETAILED DESCRIPTION OF THE INVENTION

The present invention provides a system for controlling the flow of clutch cooling fluid to fluid conduit 116 (FIG. 3). Specifically, the present invention provides greater control of clutch cooling fluid flow and enables precise control and coordination of clutch slippage and clutch cooling. In accordance with the one embodiment of the present invention, a dual setting starting clutch cooling means is provided. This system provides a two position on/off device that allows two states—(1) full coolant flow, or (2) no coolant flow.

Figure 4:
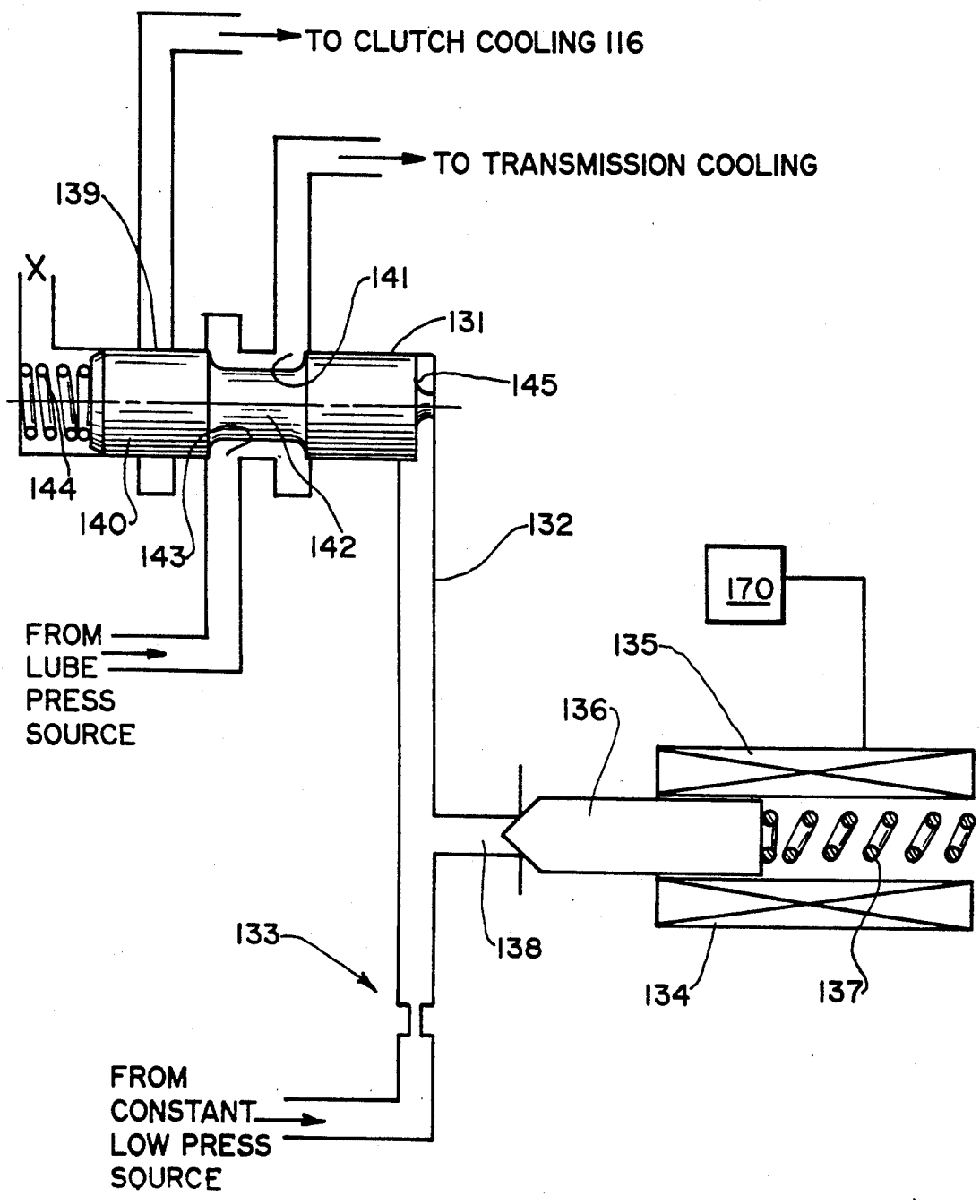
FIG. 4 is schematic diagram of a two position on clutch cooling system in accordance the present invention.

Referring to FIG. 4, the clutch cooling system in accordance with this embodiment of the present invention includes a conduit 132 leading from a constant low pressure source (not shown) to a spool valve 131. A solenoid valve 134, preferably a normally closed (NC) solenoid, seals a port 138 extending from conduit 132. The spool valve 131 includes a spool 140. In its natural state (i.e. when the valve spring 144 is not compressed), spool 140 extends over and seals a first outlet 139 which leads to cooling fluid conduit 116 of the start clutch 12a (FIG. 3), while a second outlet 141 leading to transmission cooling (not shown) is open.

This system operates as follows. A lubricant or fluid from a lubricant pressure source (not shown) is introduced into the valve chamber 142 through inlet 143. Depending on the valve 131 position, the lubricant is directed to either the starting clutch cooling through outlet 139, or to the transmission cooling through outlet 141. The position of the spool 140 is determined by the amount of pressure which is applied to the remote end 145 of spool 140. This pressure is controlled by solenoid 134.

During periods when clutch slippage is occurring and clutch cooling is required, the solenoid 134 is not energized. When the solenoid 134 is not energized, port 138 is sealed by armature 136, and hydraulic pressure is allowed to build up within conduit 132. When this pressure is applied to the remote end 145 of spool 140 the force of the valve spring 144 is overcome, and the spool laterally moves to the left thereby exposing outlet 139 and allowing cooling lubricant to flow to the clutch cooling, while sealing outlet 141 and restricting cooling lubricant flow to the transmission.

Once the clutch slippage ceases, cooling is no longer required. The solenoid is then energized by a signal from an electronic control system 170 When electrical power is supplied to the solenoid, the magnetic field produced attracts the armature 136 to a position further within the coil 135, thereby opening port 138. This creates a sufficient leak in the circuit to drop the pressure through the orifice 133. When the pressure applied to the remote end 145 of spool 140 is lowered, the spring 144 forces the spool 140 back to its natural state, and shuts off clutch cooling while directing the flow to general transmission cooling.

Figure 5:
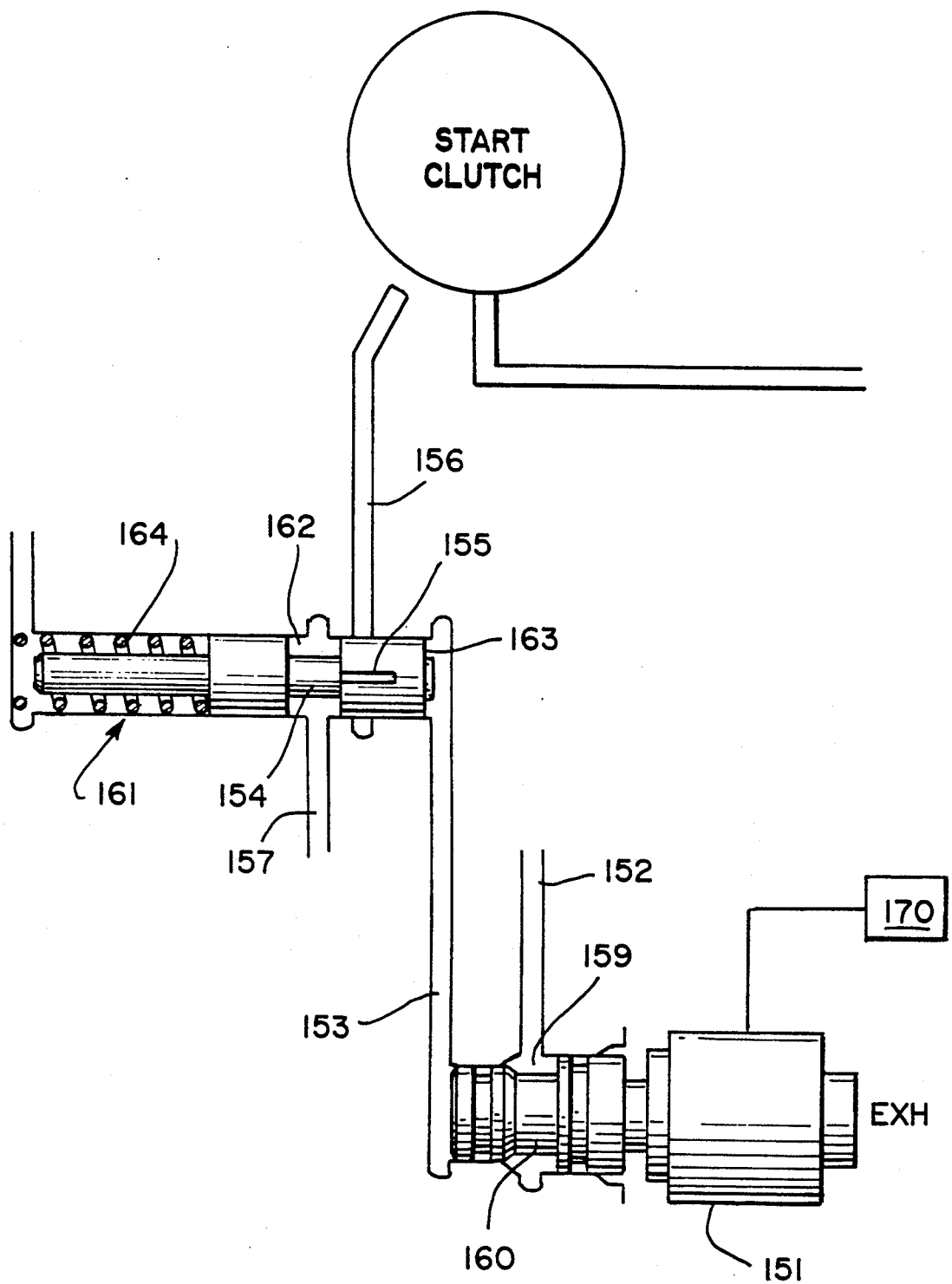
FIG. 5 is a schematic diagram of a clutch cooling system having proportional cooling flow in accordance with the present invention.

In accordance with a second embodiment of the present invention, there is provided proportional starting clutch cooling flow as a function of electrical input. Referring to FIG. 5, this embodiment of the invention includes a high response solenoid valve 151 and a clutch cooling spool valve 161, both of which interconnect a series of conduits including a pressure feed conduit 152, a pilot pressure conduit 153, a lubricant feed line 157 and a clutch cooling line 156.

The high response solenoid valve 151 is preferably a PWM solenoid 151 and is used to control the pilot pressure which is exerted on the remote end 163 of the clutch cooling valve 161. The armature 160 of solenoid 151 extends through chamber 159. Chamber 159 connects two conduits, a pressure feed conduit 152 and a pilot pressure conduit 153. A constant pressure source (not shown) provides a fixed pressure in the pressure feed conduit 152. When a PWM signal is sent from an electronic control system 170 to the solenoid 151, armature 160 adjusts, thereby modulating the pilot pressure in the pilot pressure conduit 153. Accordingly, the pressure in the pilot pressure conduit 153 is a function of the cyclic frequency of electrical input to the solenoid valve.

Spool valve 161 regulates the flow rate of the clutch cooling fluid. As can best be seen in FIGS. 5, 5a and 5b, spool valve 161 includes a housing 168 which defines a chamber 162. A spool 154 is movably mounted within said chamber 162 by a spring 164. Two conduits extend from and communicate with the chamber 162—a lubricant or cooling fluid feed line 157 and a clutch cooling line 156.

As the spool 154 traverses the chamber 162, the leading edge 167 of spool 154 coincides with a slot or notch 165 defined by the housing 168 to form a variable orifice 166. The orifice 166 allows clutch cooling lubricant to flow from the lubricant feed line 157 through chamber 162, through the orifice 166, and into the clutch cooling line 156. The size of orifice 166 varies depending on the lateral position of spool 154 along the chamber 162. Preferably, spool 154 includes a slot 155 extending therein. The slot 154 allows a minimum amount of clutch coolant to flow to the clutch cooling line 156 when the lateral position of the spool 154 is such that its leading edge 167 does not coincide with the notch 165 and the orifice 166 is closed, as illustrated in FIG. 5.

Figure 5A:
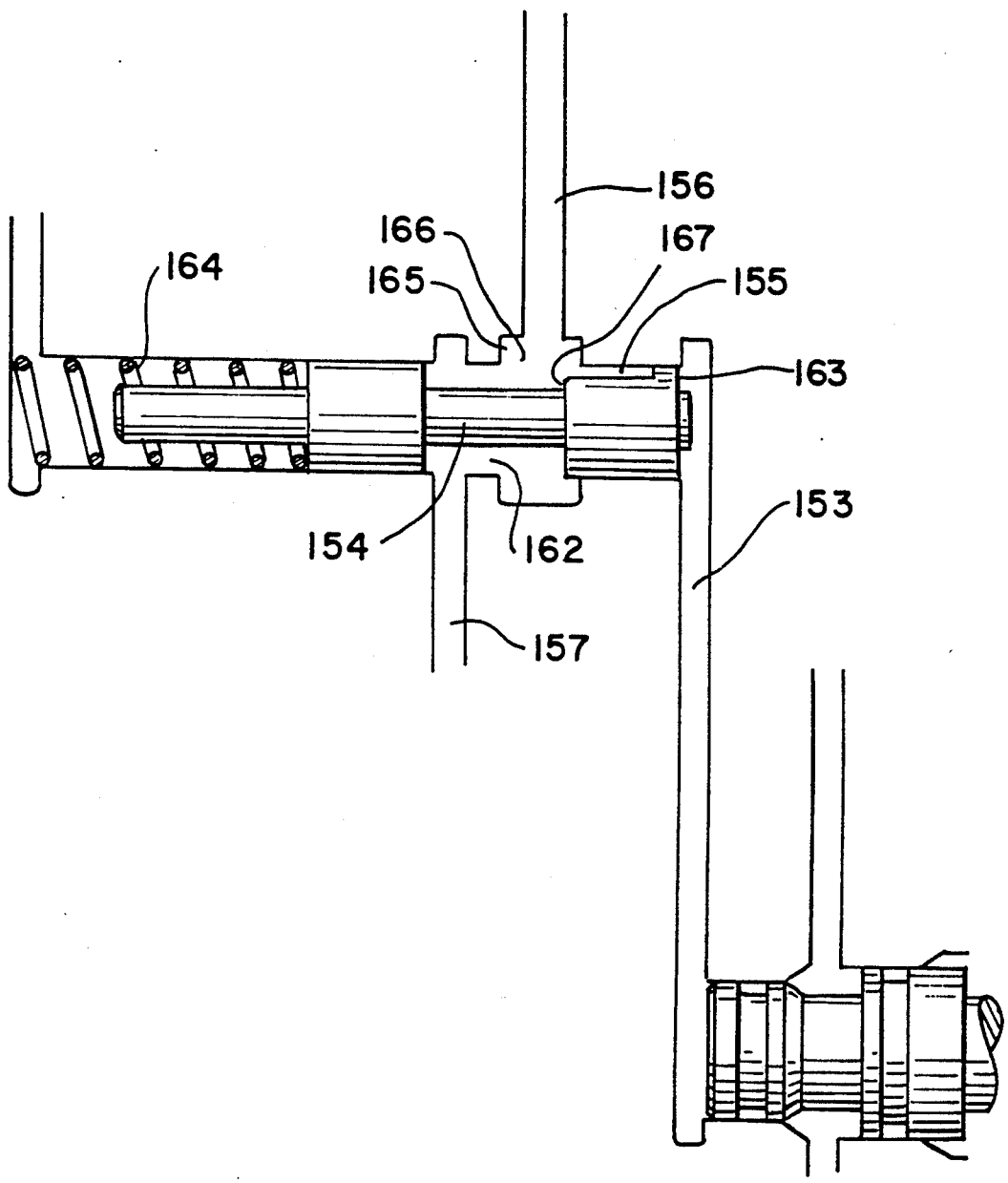
FIG. 5A is an enlarged schematic diagram of the spool valve shown in FIG. 5 illustrating the maximum flow position of the valve.
Figure 5B:
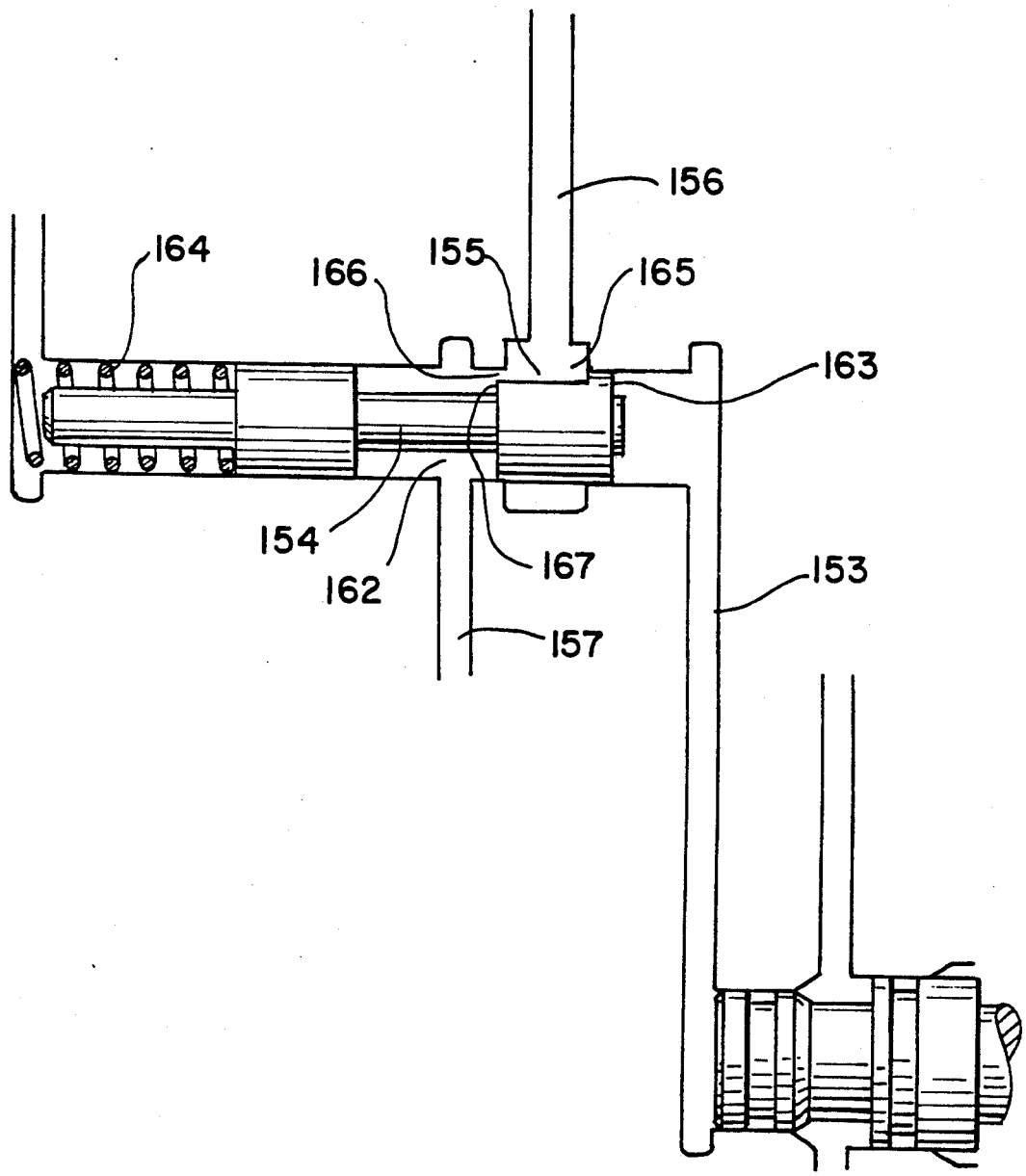
FIG. 5B is an enlarged schematic diagram of the spool valve shown in FIG. 5 illustrating the minimum flow position of the valve.

When minimal pressure is exerted on the remote end 163 of the spool 154, the spring 164 is not compressed and the spool 154 is laterally positioned such that its leading edge 167 extends essentially beyond the notch 165, as illustrated in FIG. 5a. When the spool 154 is in this position, orifice 166 has its maximum effective diameter and provides the maximum cooling fluid flow to the clutch cooling line 156. As the pilot pressure increases, the force of the spring 164 is overpowered, and the spool 154 laterally moves to the left compressing spring 164, and decreasing the size of orifice 166 until the leading edge 167 roughly coincides with the notch 165, as illustrated in FIG. 5b. When the spool 154 is in this position, orifice 166 is closed and the coolant flow rate equals the minimum flow rate allowed by slot 155.

Depending on the size of the slot 155 and the notch 165, coolant flow rate can vary from a predetermined minimum flow rate to a predetermined maximum flow rate. Preferably valve 161 provides a flow rate ranging from a minimum of i liter/minute to a maximum of 9 liters/minute.

The cooling fluid flow rate is directly proportional to the size of the orifice 166. The size of orifice 166 is based on the location of the spool 154, which is determined by the pilot pressure. Since the pilot pressure is determined by the PWM signal sent to the solenoid, the overall result is that control of the amount of clutch cooling flow is a direct function of the electrical signal to the solenoid valve 151.

Accordingly, in accordance with this embodiment of the present invention, the exact amount of clutch coolant circulated through the starting clutch can be regulated simply by varying the electrical signal to the solenoid valve 151. The electrical frequency signal sent to the solenoid 151 typically ranges from 0 to 67 Hertz to provide a cooling flow rate ranging from 1 liter/minute to 9 liters/minute. Accordingly, when the clutch slippage is at its greatest, i.e. when the automobile is first started, no electrical frequency signal is sent to the solenoid 151, resulting in the maximum flow of 9 liters/minute of clutch coolant through conduit 156. Alternatively, when an engine is operating at light throttle, less slippage occurs and less coolant flow is required. Therefore, a moderate signal can be sent to the solenoid, resulting in a moderate coolant flow rate, which is determined by the energy absorption requirements of the clutch relative and engine torque. Finally, when the engine is operating at steady state speed or when the transmission is in neutral, there is no clutch slippage and minimal coolant flow is required. Therefore, a 67 Hertz electrical signal can be sent to solenoid 151, resulting in minimal coolant flow (1 liter/minute) to the clutch.

During maximum slip and energy input the temperature of a start clutch can range in excess of 450° F. When a clutch cooling system in accordance with the present invention is utilized the clutch temperature during maximum slip and energy input is reduced to as low as approximately 370° F.

In either embodiment of the present invention, clutch cooling passage pressures are preferably about 2 bar (30 psi). Such pressures provide the best use of available energy. The cooling lubricant used in the present invention can be any petroleum based transmission fluid. In a preferred embodiment of the present invention the cooling lubricant is an automatic transmission fluid with friction modifiers which provide low static to dynamic friction characteristics.

It will be understood by those skilled in the art that in yet another embodiment of the present invention a three-way solenoid can be used in a manner similar to both of the foregoing described embodiments of the present invention.

Figure 6:
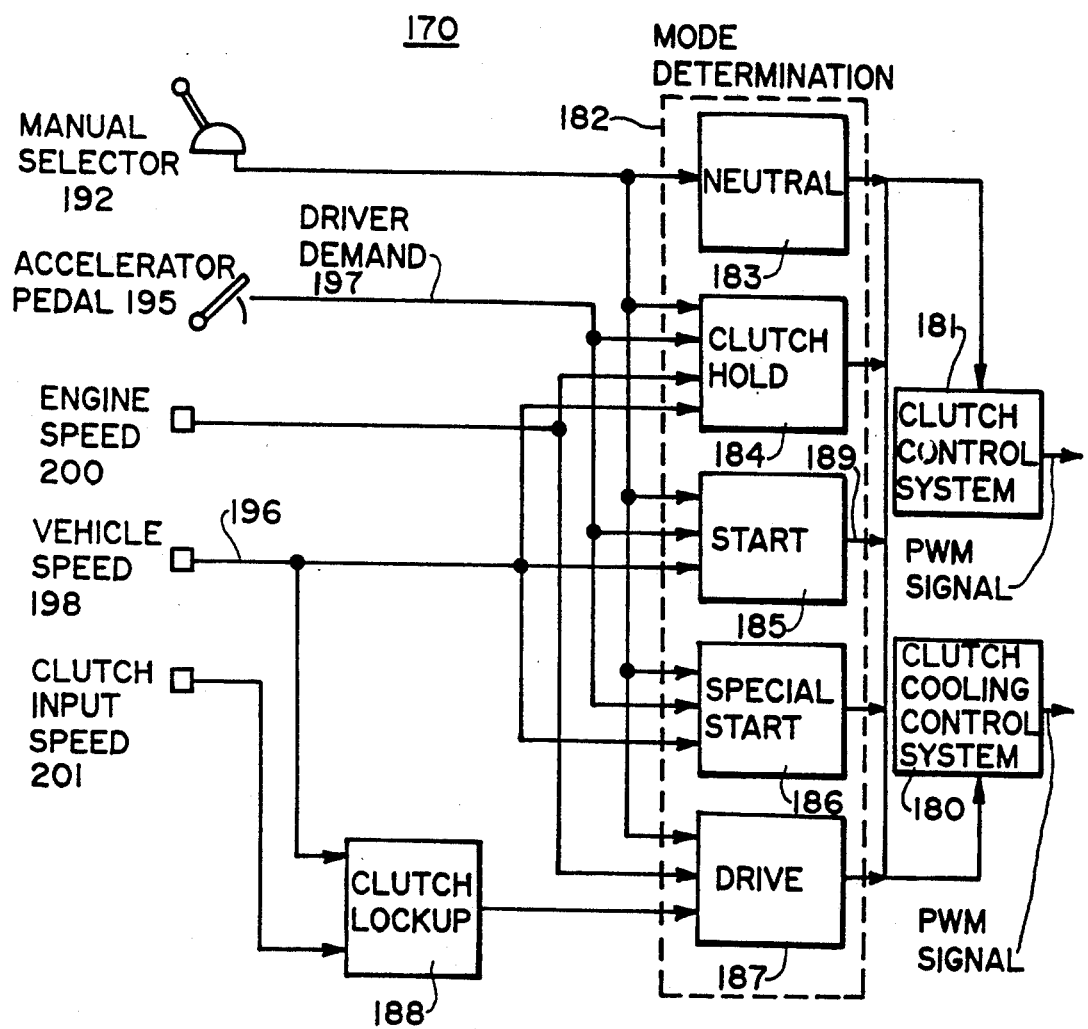
FIG. 6 is a block diagram of portions of an electronic control system for controlling a start clutch and its cooling system in accordance with the present invention.

The present invention can be utilized with electronic clutch control systems such as the one described in U.S. Pat. No. 4,648,496, which is incorporated herein by reference. Referring to FIG. 6, there is illustrated a typical clutch control system that the present invention can be used in combination with. This electronic control system 170 includes a mode determination circuit 182 which receives input signals from a number of automobile operating variables including manual selector location 192, driver demand as determined by accelerator pedal location 195, engine speed 200, vehicle speed 198, and clutch input speed 201. Upon reading these parameters, the mode determination circuit 182 determines at which mode the clutch and the clutch cooling systems should be operating. Several operating modes are available including neutral 183, clutch hold 184, start 185, special start 186 and drive 187. After the clutch mode determination circuit 182 determines the appropriate mode, an appropriate signal is sent to the clutch control system 181 and the clutch cooling control system 180.

By way of example, when manual selector 192 is in the neutral position, or when it is in the drive position and the vehicle is moving down a freeway at a steady state speed, adjustment of the clutch is not required and clutch control system 181 and the clutch cooling system 180 are not employed. To enter the start mode, the driver steps on the accelerator and changes the state of the driver demand signal on line 197. The system also checks, in start mode determination circuit 185, to be certain the vehicle speed on line 196 indicates the vehicle is still at less than a predetermined speed. Because the vehicle was at rest, the transmission ratio is still in low and the clutch is not locked up. The output signal from start mode circuit 185 on line 189 tells clutch control system 181 to begin to engage the clutch by increasing fluid pressure in the clutch fluid pressure chamber 102 (FIG. 3). As discussed above, when the fluid pressure is increased in the fluid pressure chamber 102, the force of the Belleville spring 78 is overpowered. The pressure plate 72 is thus thrust into contact with the clutch disc assembly 76, and therethrough into driving communication with the reaction plate 74 through the friction faces 108, 110 of the clutch disc 106.

While the clutch is engaging slippage occurs. The amount of slippage is determined by the ratio of the vehicle speed signal 198 and the clutch input speed signal 201. When that ratio is 1:1, the clutch is locked up and the clutch is not slipping. Similarly, when the vehicle speed is 0, the ratio is 0 and the clutch is not slipping. When the ratio is between 0 and 1, however, clutch slippage is occurring, and the mode determination circuit 182 signals the clutch cooling control system 180 to send an appropriate PWM signal to solenoid valve 134 (FIG. 4), 151 (FIG. 5). In accordance with the second embodiment of the present invention described above and illustrated in FIG. 5, a given PWM signal will be sent to solenoid valve 151 to initiate a predetermined amount of cooling fluid flow for the given amount of clutch slippage. Thus when the ratio is close to 0, the PWM signal will initiate maximum coolant flow. As the clutch approaches lockup, the ratio will go from 0 to 1, and the PWM signal will vary proportionately with the ratio in order to reduce the coolant flow rate until the flow rate reaches the minimum 1 liter/minute flow rate once the clutch is locked up.

Accordingly, this system permits computer control of clutch cooling which allows much more flexibility of when and how much the clutch can be slipped. In particular, since the computer is constantly monitoring the overall performance parameters, it can instantly determine the need for clutch slippage, as well as the amount of clutch slippage. The present invention allows the computer to continuously make the necessary slippage adjustments by providing a means for determining and providing the exact amount of clutch cooling required as a result of the predetermined clutch slippage.

What is claimed is:

1. A clutch cooling system for cooling a clutch used in combination with a continuously variable transmission having an input variable-diameter pulley and an output variable-diameter pulley, said pulleys each having a fixed sheave and a movable sheave, a belt connecting said pulleys, and a means for controlling axial movement of said input movable sheave and said output movable sheave to alter the effective diameter of said input pulley to provide a continuously variable drive ratio, and to alter the effective diameter of said output pulley to maintain belt tension, said cooling system comprising:

a pressure controlled spool valve having a first position and a second position, said first position allowing flow of cooling fluid to a clutch cooling circuit, and said second position allowing flow of cooling fluid to a transmission cooling circuit, said spool valve position being determined by the amount of pressure applied to a remote end of said spool valve;

a conduit linking said remote end of said pressure controlled spool valve to a pressure source;

a port extending from said conduit;

a solenoid valve adjacent to said port such that it controls flow through said port;

a restrictive orifice within said conduit located between said pressure source and said port; and a solenoid valve capable of adjustment of said spool valve between said first and second positions by energization of said solenoid valve, energization of said solenoid valve being effective to provide a regulation of the pressure applied at said remote end of said spool valve.

2. The clutch cooling system of claim 1 wherein said solenoid valve is a normally closed (NC) solenoid valve.

3. The clutch cooling system of claim 1 wherein said solenoid valve is a three-way solenoid valve.

4. The clutch cooling system of claim 1 wherein said means for regulating clutch slippage is an electronic clutch control system having a mode determination circuit which receives input signals for a number of automobile operating variables, and upon reading said variables determines at which mode the clutch and the clutch cooling systems should be operating.

5. The clutch cooling system of claim 1 wherein said clutch is a slippable fluid actuated start clutch.

6. The clutch cooling system of claim 5 wherein said clutch is located upstream of said belt and sheave system.

7. The clutch cooling system of claim 5 wherein said clutch is located downstream said belt and sheave system.

8. The clutch cooling system of claim 5 wherein said clutch includes a cover plate, a pressure plate, a reaction plate, a clutch disc assembly, a Belleville spring, and connecting means, a clutch fluid pressure chamber defined by said cover plate and said pressure plate, and a clutch cooling fluid cavity; said clutch disc assembly including a clutch disc, an annular ring, and a spline member, said clutch disc having an energy-absorbing layer and a friction material layer mounted on each of its faces, said clutch disc being positioned between and engageable by said pressure plate and said reaction plate, said clutch disc further being drivingly affixed to the outer perimeter of said annular ring and secured to said spline member at the inner diameter of said annular ring; wherein said clutch cooling fluid cavity is defined by said reaction plate and said annular ring, and said clutch further includes means for communicating coolant fluid from said cooling fluid cavity past said friction face.

9. A clutch cooling system for cooling a clutch used in combination with a continuously variable transmission having an input variable-diameter pulley and an output variable-diameter pulley, said pulleys each having a fixed sheave and a movable sheave, a belt connecting said pulleys, and a means for controlling axial movement of said input movable sheave and said output movable sheave to alter the effective diameter of said input pulley to provide a continuously variable drive ratio, and to alter the effective diameter of said output pulley to maintain belt tension, said cooling system comprising:

a pressure controlled spool valve including a housing defining a chamber and a spool movably mounted within said chamber, said housing further defining a notch, and said spool having a leading edge such that as said spool traverses said chamber said leading edge traverses said notch to form a variable orifice therebetween;

a pressure controlling means for adjusting the pressure applied to a remote end of said spool such that as the pressure applied to said remote end is varied said the leading edge of said spool traverses said notch and the size of said variable orifice is increased;

a cooling fluid feed line extending from said chamber and a clutch cooling line extending from said chamber such that cooling fluid can flow from said cooling fluid feed line, into said chamber, through said orifice and into said clutch cooling line.

10. The clutch cooling system of claim 9 wherein said spool includes a slot which allows minimum flow from said cooling fluid feed line to said clutch cooling line when said spool is positioned such that said leading edge does not coincide with said notch and no orifice is formed.

11. The clutch cooling system of claim 9 wherein said pressure controlling means includes a solenoid valve, a pressure feed conduit leading from a pressure source to said solenoid valve, and a pilot pressure conduit extending from said solenoid valve to said remote end of said spool valve.

12. The clutch cooling system of claim 9 further including a means for regulating clutch slippage wherein during a given amount of clutch slippage a predetermined electrical signal is sent to said pressure controlling means resulting in a given pressure being applied to said remote end of said spool.

13. A clutch cooling system for cooling a clutch used in combination with a continuously variable transmission having an input variable-diameter pulley and an output variable diameter pulley, said pulleys each having a fixed sheave and a movable sheave, a belt connecting said pulleys, and a means for controlling axial movement of said input movable sheave and said output movable sheave to alter the effective diameter of said input pulley to provide a continuously variable drive ratio, and to alter the effective diameter of said output pulley to maintain belt tension, said cooling system comprising:

- a pressure controlled spool valve including a housing defining a chamber and a spool movably mounted within said chamber, said housing further defining a notch, and said spool having a leading edge such that as said spool traverses said chamber said leading edge traverses said notch to form a variable orifice therebetween;
- a pressure controlling means for adjusting the pressure applied to a remote end of said spool such that as the pressure applied to said remote end is varied said the leading edge of said spool traverses said notch and the size of said variable orifice is increased, said pressure controlling means including a solenoid valve, a pressure feed conduit leading from a pressure source to said solenoid valve, and a pilot pressure conduit extending from said solenoid valve to said remote end of said spool valve;
- a cooling fluid feed line extending from said chamber and a clutch cooling line extending from said chamber such that cooling fluid can flow from said cooling fluid feed line, into said chamber, through said orifice and into said clutch cooling line;
- said spool including a slot which allows minimum flow from said cooling fluid feed line to said clutch cooling line when said spool is positioned such that said leading edge does not coincide with said notch and no orifice is formed; and
- a means for regulating clutch slippage wherein during a given amount of clutch slippage a predetermined electrical signal is sent to said pressure controlling means resulting in a given pressure being applied to said remote end of said spool.

14. The clutch cooling system of claim 13 wherein said solenoid valve is a high response PWM solenoid.

15. The clutch cooling system of claim 13 wherein said pressure controlling means includes a three-way solenoid valve.

16. The clutch cooling system of claim 13 wherein said means for regulating clutch slippage is an electronic clutch control system having a mode determination circuit which receives input signals for a number of automobile operating variables, and upon reading said variables determines at which mode the clutch should be operating and the amount of clutch cooling required for that clutch mode.

17. The clutch cooling system of claim 13 wherein said clutch is a slippable fluid actuated start clutch.

18. The clutch cooling system of claim 17 wherein said clutch is located upstream of said belt and sheave system.

19. The clutch cooling system of claim 17 wherein said clutch is located downstream said belt and sheave system.

20. The clutch cooling system of claim 17 wherein said clutch includes a cover plate, a pressure plate, a reaction plate, a clutch disc assembly, a Belleville spring, and connecting means, a clutch fluid pressure chamber defined by said cover plate and said pressure plate, and a clutch cooling fluid cavity; said clutch disc assembly including a clutch disc, an annular ring, and a spline member, said clutch disc having an energy-absorbing layer and a friction material layer mounted on each of its faces, said clutch disc being positioned between and engageable by said pressure plate and said reaction plate, said clutch disc further being drivingly affixed to the outer perimeter of said annular ring and secured to said spline member at the inner diameter of said annular ring; wherein said clutch cooling fluid cavity is defined by said reaction plate and said annular ring, and said clutch further includes means for communicating coolant fluid from said cooling fluid cavity past said friction face.

* * * * *